United States Patent
Alam (10) Patent No.: US 10,724,842 B2
(45) Date of Patent: Jul. 28, 2020

(54) RELATIVE ANGLE ESTIMATION USING INERTIAL MEASUREMENT UNITS

(71) Applicant: Caterpillar Trimble Control Technologies LLC, Dayton, OH (US)

(72) Inventor: Nima Alam, Liberty Township, OH (US)

(73) Assignee: Caterpillar Trimble Control Technologies LLC, Dayton, OH (US)

( * ) Notice: Subject to any disclaimer, the term of this patent is extended or adjusted under 35 U.S.C. 154(b) by 262 days.

(21) Appl. No.: 15/887,717

(22) Filed: Feb. 2, 2018

(65) Prior Publication Data

US 2019/0242687 A1 Aug. 8, 2019

(51) Int. Cl.
| | |
|---|---|
| G01B 5/24 | (2006.01) |
| G01C 9/08 | (2006.01) |
| E02F 9/26 | (2006.01) |
| G06F 17/16 | (2006.01) |
| B25J 13/08 | (2006.01) |
| G06K 9/62 | (2006.01) |

(52) U.S. Cl.
CPC .............. G01B 5/24 (2013.01); E02F 9/264 (2013.01); G01C 9/08 (2013.01); G06F 17/16 (2013.01); B25J 13/088 (2013.01); G06K 9/6289 (2013.01)

(58) Field of Classification Search
None
See application file for complete search history.

(56) References Cited

U.S. PATENT DOCUMENTS

| | | | |
|---|---|---|---|
| 8,738,242 B2 | 5/2014 | Konno et al. | |
| 9,347,205 B2 | 5/2016 | Kosarev et al. | |
| 9,605,962 B2 | 3/2017 | Jordil | |
| 2011/0144543 A1* | 6/2011 | Tsuzuki | A61B 5/1114 600/595 |
| 2015/0268042 A1 | 9/2015 | Fehr | |
| 2016/0160472 A1 | 6/2016 | Voda et al. | |
| 2016/0376772 A1 | 12/2016 | Kondo et al. | |

FOREIGN PATENT DOCUMENTS

| | | |
|---|---|---|
| WO | 2016/164975 A1 | 10/2016 |
| WO | WO-2018092944 A1 * | 5/2018 ............... A61B 5/11 |

OTHER PUBLICATIONS

Cooper et al., "Inertial sensor-based knee flexion/extension angle estimation" Journal of Biomechanics 42 (2009) 2678-2685 (Year: 2009).*

(Continued)

*Primary Examiner* — John C Kuan
(74) *Attorney, Agent, or Firm* — Kilpatrick Townsend & Stockton LLP (57) ABSTRACT

A method for determining relative angles and/or trigonometric functions of the relative angles between coupled rigid bodies arranged in a series, where the series includes at least a rigid body coupled to a previous rigid body. The method includes obtaining a gravitational acceleration vector and an angular velocity of the previous rigid body and a gravitational acceleration and an angular velocity of the rigid body. The relative angles and/or trigonometric functions of the relative angles are determined without using absolute angles of the rigid bodies.

19 Claims, 8 Drawing Sheets

(56) References Cited

OTHER PUBLICATIONS

Takeda et al., "Gait analysis using gravitational acceleration measured by wearable sensors" Journal of Biomechanics 42 (2009) 223-233 (Year: 2009).*
Cheng et al., "Joint-Angle Measurement Using Accelerometers and Gyroscopes—A Survey" IEEE Transactions on Instrumentation and Measurement, vol. 59, No. 2, February 2010 (Year: 2010).*
El-Gohary et al., "Upper Limb Joint Angle Tracking with Inertial Sensors" 33rd Annual International Conference of the IEEE EMBS, Boston, Massachusetts USA, Aug. 30-Sep. 3, 2011 (Year: 2011).*
Alonge et al., "The Use of Accelerometers and Gyroscopes to Estimate Hip and Knee Angles on Gait Analysis" Sensors 2014, 14, 8430-8446 (Year: 2014).*
Dejnabadi et al., "A New Approach to Accurate Measurement of Uniaxial Joint Angles Based on a Combination of Accelerometers and Gyroscopes" IEEE Transactions on Biomedical Engineering, vol. 52, No. 8, Aug. 2005 (Year: 2005).*
International Search Report and Written Opinion for Application No. PCT/US2019/015817, dated Apr. 30, 2019, 14 pages.

\* cited by examiner

Based on an arrangement of rigid bodies coupled in a series that includes a rigid body coupled to a previous rigid body, estimate a relative angle between the previous rigid body and rigid body without using an absolute angle of the previous rigid body or an absolute angle of the rigid body as inputs. ~ 1001

FIG. 10

RELATIVE ANGLE ESTIMATION USING INERTIAL MEASUREMENT UNITS

FIELD OF THE INVENTION

Embodiments described herein relate generally to estimating relative angles between coupled rigid bodies using inertial measurement units (IMUs).

BACKGROUND

IMUs are sensors that typically use accelerometers and gyroscopes to measure linear and angular motion of an object. IMUs are commonly used in a number of applications where information about object motion is desired. Examples include vehicles, aircraft, and satellites. IMUs are also commonly used to measure motion of different parts of a larger object.

Improved methods of determining relative angles between coupled rigid bodies using IMUs are desired.

SUMMARY

Embodiments described herein provide improved methods for determining relative angles and/or trigonometric functions sin ($\alpha$) and cos ($\alpha$) of a relative angle $\alpha$ between two or more coupled rigid bodies. The relative angles and trigonometric functions are determined using information from IMUS mounted on the rigid bodies.

In accordance with an embodiment, a method for determining trigonometric functions of relative angles between separate but coupled rigid bodies includes obtaining a gravitational acceleration vector and an angular velocity of a previous rigid body from observations of an IMU mounted on the previous rigid body and obtaining a gravitational acceleration vector and an angular velocity of a rigid body from observations of an IMU mounted on the rigid body. A first trigonometric function and a second trigonometric function of a relative angle between the previous rigid body and the rigid body are estimated based at least in part on the gravitational acceleration vector and the angular velocity of the previous rigid body and the gravitational acceleration vector and the angular velocity of the rigid body.

In an embodiment, the first trigonometric function and second trigonometric function of the relative angle between the previous rigid body and the rigid body are determined without using an absolute angle of the previous rigid body or an absolute angle of the rigid body.

In another embodiment, the first trigonometric function is a sine of the relative angle and the second trigonometric function is a cosine of the relative angle.

In another embodiment, the method also includes using the sine and the cosine to determine the relative angle between the previous rigid body and the rigid body.

In another embodiment, estimating the first trigonometric function and the second trigonometric function includes determining first and second observed trigonometric functions of the relative angle, determining a rotation matrix from the previous rigid body to the rigid body, and determining at least one covariance matrix.

In yet another embodiment, the first and second observed trigonometric functions of the relative angle are determined using the gravitational acceleration vector of the previous rigid body and the gravitational acceleration vector of the rigid body.

In accordance with another embodiment, a method for estimating trigonometric functions of relative angles between coupled rigid bodies each having an IMU disposed thereon includes receiving a gravitational acceleration vector of a previous rigid body determined from observations of an IMU mounted on the previous rigid body, receiving an angular velocity of the previous rigid body from observations of the IMU mounted on the previous rigid body, receiving a gravitational acceleration vector of a rigid body determined from observations of an IMU mounted on the rigid body, and receiving an angular velocity of the rigid body from observations of the IMU mounted on the rigid body. First and second trigonometric functions of the relative angle between the previous rigid body and the rigid body are estimated based at least in part on the gravitational acceleration vector and the angular velocity of the previous rigid body and the gravitational acceleration vector and the angular velocity of the rigid body. The method also includes receiving a gravitational acceleration vector and an angular velocity of a next rigid body determined from observation of an IMU mounted on the next rigid body. First and second trigonometric functions of the relative angle between the rigid body and the next rigid body are estimated based at least in part on the gravitational acceleration vector and the angular velocity of the rigid body and the gravitational acceleration vector and the angular velocity of the next rigid body.

In an embodiment, the first and second trigonometric functions of the relative angle between the rigid body and the next rigid body are determined without using an absolute angle of the rigid body or an absolute angle of the next rigid body.

In another embodiment, the first and second trigonometric functions of the relative angle between the rigid body and the next rigid body are determined without using the gravitational acceleration vector of the previous rigid body.

In accordance with another embodiment, a method for determining trigonometric functions of relative angles between a series of separate but coupled rigid bodies, including a previous rigid body and a rigid body, comprises receiving a gravitational acceleration vector of the previous rigid body and a gravitational acceleration vector of the rigid body, and calculating first and second observed trigonometric functions of the relative angle between the previous rigid body and the rigid body. The method also includes receiving an angular velocity of the previous rigid body, an angular velocity of the rigid body, a rotation matrix from the previous rigid body to the rigid body, and at least one covariance matrix. First and second trigonometric functions of the relative angle between the previous rigid body and the rigid body are calculated based on the first and second observed trigonometric functions of the relative angle, the angular velocity of the previous rigid body, the angular velocity of the rigid body, the rotation matrix from the previous rigid body to the rigid body, and the at least one covariance matrix.

In an embodiment, receiving the at least one covariance matrix includes receiving at least one of an initial estimation error covariance matrix, a process noise covariance matrix, or an observation noise covariance matrix.

In another embodiment, the method also includes determining a relative angle between the rigid body and a next rigid body without using the first and second trigonometric functions of the relative angle between the previous rigid body and the rigid body.

In accordance with yet another embodiment, a method for determining relative angles between pivotally coupled rigid bodies arranged in series includes receiving a gravitational acceleration vector and an angular velocity of a previous rigid body determined from observations of an IMU mounted on the previous rigid body, and receiving a gravitational acceleration vector and an angular velocity of a rigid body determined from observations of an IMU mounted on the rigid body. A relative angle between the previous rigid body and the rigid body is estimated based on the gravitational acceleration vector and the angular velocity of the previous rigid body and the gravitational acceleration vector and the angular velocity of the rigid body. The relative angle between the previous rigid body and the rigid body is determined without using an absolute angle of the previous rigid body or an absolute angle of the rigid body.

DETAILED DESCRIPTION

Embodiments described herein provide improved methods of determining relative angles and/or trigonometric functions of relative angles between coupled rigid bodies. In some embodiments, for example, trigonometric functions of a relative angle can be determined based on measurements and calculated parameters from the rigid body and an immediately prior rigid body in a series without requiring information from earlier rigid bodies in the series.

An example of a series of rigid bodies that will be used throughout this application is an excavator that includes a number of movable parts (or bodies) that are pivotally coupled together. It should be appreciated that an excavator is used merely as an example, and the embodiments described herein may be used with any other heavy equipment, vehicles, machinery, or objects that include rigid bodies coupled in series.

Figure 1:
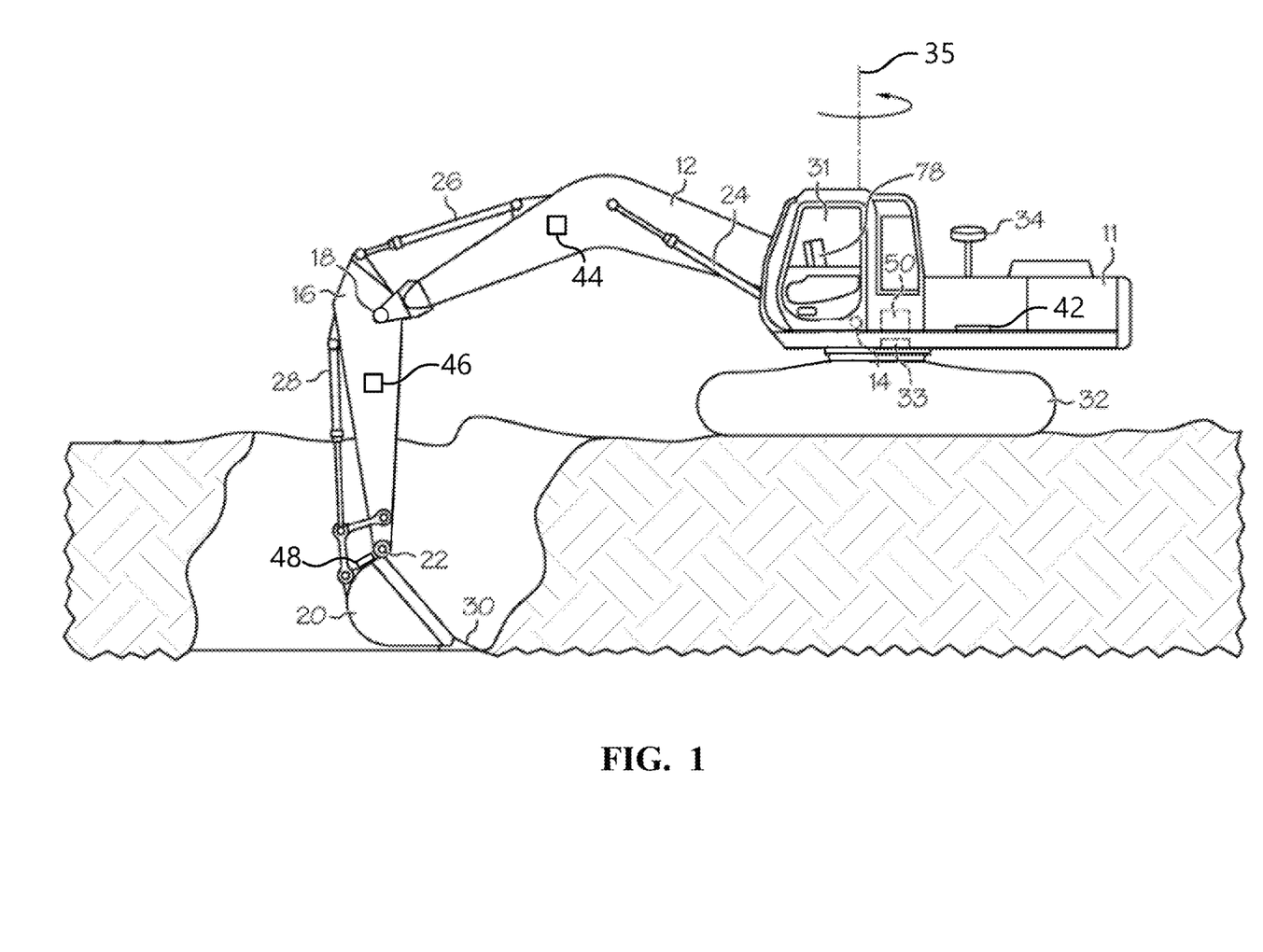
FIG. 1 is a simplified side view of an excavator (an example of an object having a series of coupled rigid bodies) in accordance with an embodiment.

FIG. 1 is a simplified side view of an excavator that includes a platform 11, a boom 12, a stick 16, and a bucket 20. The boom 12 is pivotally coupled to the platform 11 at a pivot point 14, the stick 16 is pivotally coupled to the boom 12 at a pivot point 18, and the bucket 20 is pivotally coupled to the stick 16 at a pivot point 22. Hydraulic devices 24, 26, 28 are provided to move the boom 12, the stick 16, and the bucket 20. The bucket 20 includes teeth 30 that may assist in digging. The platform 11 includes a cab 31 supported on an undercarriage 32 that may include wheels or tracks to facilitate movement of the excavator over a worksite. The platform 11 can be rotated about a generally vertical axis 35 by a hydraulic motor 33. It should be appreciated that although this example includes a one-piece boom, embodiments described herein can be utilized with excavators having variable angle booms. Further, the excavator can be used with other implements or tools besides the bucket 20 such as augers, trenchers, compactors, and the like.

Excavators commonly utilize a variety of sensors to monitor positions of various machine elements and/or to provide a display of the element positions to an operator. As an example, relative angles between the platform 11, the boom 12, the stick 16, and the bucket 20 can be determined using encoders; sensors associated with pivot points 14, 18, 22; string encoders associated with hydraulic devices 24, 26, 28; and/or other sensors. Alternatively, angles of the bodies can be determined relative to gravity using inclinometers such as IMUs. In the example of FIG. 1, the excavator includes an IMU 42 on the platform 11, an IMU 44 on the boom 12, an IMU 46 on the stick 16, and an IMU 48 on the bucket 20. These IMUs can be used to determine, for example, gravitational acceleration and angular velocity of the rigid bodies. The IMUs may operate in one or multiple axes.

The excavator in this example includes a controller 50 having an associated memory. The controller 50 may be responsive to the IMUs for determining a position of the bucket 20 and/or teeth 30 based on the relative angles of the bodies. The position can be determined relative to the platform 11 or a point on the platform 11, or the platform 11 may include a position sensor, such as Global Navigation Satellite System (GNSS) positioning system 34, that allows the position to be determined in another coordinate frame.

The controller 50 may also determine a difference between the position of the bucket 20 and a desired elevation at a digging point on the worksite. The desired elevation may be determined from a desired topology that is stored in memory. An operator may control movement of the excavator using controls in the cab 31 and/or the controller 50 may provide automated machine control. A display 78 in the cab 31 may assist the operator by showing a current position of the bucket 20 and a desired elevation. The automated machine control may move the parts or bodies based on the position of the bucket 20 and/or teeth 30 relative to the desired elevation.

Figure 2:
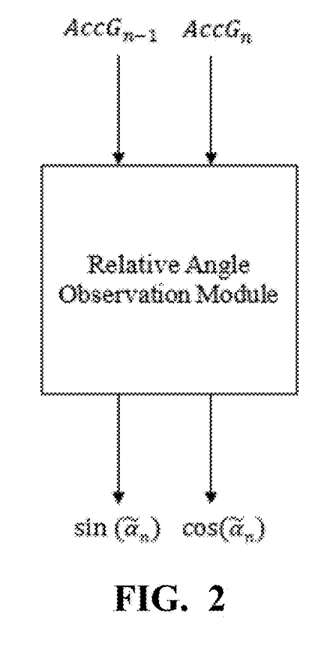
FIG. 2 is a flowchart illustrating a method of determining observed trigonometric functions of a relative angle between rigid bodies in accordance with an embodiment.

FIG. 2 is a flowchart illustrating a method of determining observed trigonometric functions $\sin(\tilde{\alpha}_n)$ and $\cos(\tilde{\alpha}_n)$ of a relative angle $\alpha$ between a rigid body n and a previous rigid body n−1 in accordance with an embodiment. The rigid body n and the previous rigid body n−1 in this example are rigid bodies that are pivotally coupled. In one embodiment, the observed trigonometric functions $\sin(\tilde{\alpha}_n)$ and $\cos(\tilde{\alpha}_n)$ are calculated, at a relative angle observation modue, based on a gravitational acceleration vector $AccG_{n-1}$ of the previous rigid body n−1 and a gravitational acceleration vector $AccG_n$ of the rigid body n. In one example, the gravitational acceleration vector $AccG$ is a 3D vector with elements x, y, and z. The elements are typically aligned to x, y, and z axes of the corresponding rigid body.

Generally, the gravitation acceleration is not measured directly by an IMU. Instead, the gravitation acceleration, or a gravitational acceleration vector $AccG_n$, can be determined using known techniques from IMU observations.

Figure 3:
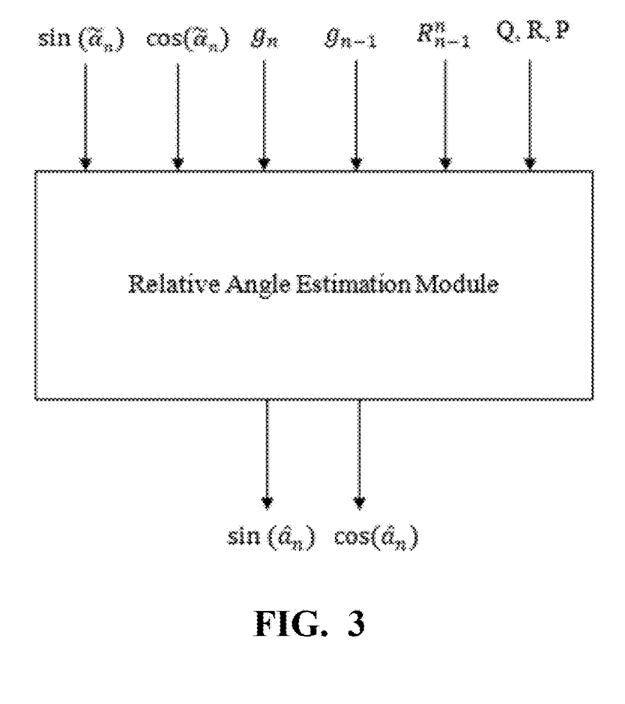
FIG. 3 is a flowchart illustrating a method of determining trigonometric functions of a relative angle between rigid bodies in accordance with an embodiment.

The observed trigonometric functions $\sin(\tilde{\alpha}_n)$ and $\cos(\tilde{\alpha}_n)$ of the relative angle $\alpha$ between the rigid body n and the previous rigid body n−1 may be used in a relative angle estimation module as described in FIG. 3 to determine estimated trigonometric functions $\sin(\hat{\alpha}_n)$ and $\cos(\hat{\alpha}_n)$. The estimated trigonometric functions may be more accurate than the observed trigonometric functions.

In a particular embodiment, the observed trigonometric functions $\sin(\tilde{\alpha}_n)$ and $\cos(\tilde{\alpha}_n)$ may be calculated using observations from an $IMU_n$ mounted on the rigid body n and an $IMU_{n-1}$ mounted on the previous rigid body n−1 and the following equations:

$$\begin{cases} \sin(\tilde{\alpha}_n) = \dfrac{AccG_{n-1}(x)AccG_n(y) - AccG_{n-1}(y)AccG_n(x)}{AccG_n(x)^2 + AccG_n(y)^2} & \text{Equation (1)} \\ \cos(\tilde{\alpha}_n) = -\dfrac{AccG_{n-1}(x)AccG_n(x) + AccG_{n-1}(y)AccG_n(y)}{AccG_n(x)^2 + AccG_n(y)^2} \end{cases}$$

At the relative angle estimation module of FIG. 3, an angular velocity ($g_n$) of the rigid body n, an angular velocity ($g_{n-1}$) of the previous rigid body n−1, a rotation matrix ($R_{n-1}^n$) from the previous rigid body n−1 to the current rigid body n, a process noise covariance matrix in Kalman Filter parameter, an observation noise covariance matrix in Kalman Filter parameter, and an initial estimation error covariance matrix in Kalman Filter parameter (Q, R, P), respectively, are used along with observed trigonometric functions $\sin(\tilde{\alpha}_n)$ and $\cos(\tilde{\alpha}_n)$ to determine estimated trigonometric functions $\sin(\hat{\alpha}_n)$ and $\cos(\hat{\alpha}_n)$.

In a particular embodiment, a first relative angle rate $\omega$ is calculated using the following equations:

$$\omega = \begin{bmatrix} \omega_x \\ \omega_y \\ \omega_z \end{bmatrix} = g_n - R_{n-1}^n g_{n-1} \quad \text{Equation (2)}$$

with a process model:

$$F = \begin{bmatrix} 1 & \tau\omega_z \\ -\tau\omega_z & 1 \end{bmatrix} \quad \text{Equation (3)}$$

and the observation model:

$$H = \begin{bmatrix} 1 & 0 \\ 0 & 1 \end{bmatrix} \quad \text{Equation (4)}$$

and Q, R, and P as process noise covariance matrix, observation noise covariance matrix, and initial estimation error covariance matrix based on Kalman Filter parameters, respectively.

Defining the following state vector for the Kalman Filter:

$$X \triangleq \begin{bmatrix} \sin(\hat{\alpha}_n) \\ \cos(\hat{\alpha}_n) \end{bmatrix} \quad \text{Equation (5)}$$

and the observation vector:

$$Z \triangleq \begin{bmatrix} \sin(\tilde{\alpha}_n) \\ \cos(\tilde{\alpha}_n) \end{bmatrix} \quad \text{Equation (6)}$$

The time update of the Kalman Filter is:

$$\begin{cases} X^-(t) = FX^+(t-\tau) \\ P^-(t) = FP^+(t-\tau)F^T + Q \end{cases} \quad \text{Equation (7)}$$

and the measurement update of the Kalman Filter is:

$$\begin{cases} K(t) = P^-(t)H^T[HP^-(t)H^T + R]^{-1} \\ X^+(t) = X^-(t) + K(t)[Z - HX^-(t)] \\ P^+(t) = P^-(t) - K(t)HP^-(t) \end{cases} \quad \text{Equation (8)}$$

where superscripts "+" and "−" represent posteriori and priori estimates respectively. K(t) is the Kalman gain, and superscript "T" is the matrix transpose operator. At each time epoch, $X^+$ is the estimation vector for $\sin(\hat{\alpha}_n)$ and $\cos(\hat{\alpha}_n)$.

Figure 4:
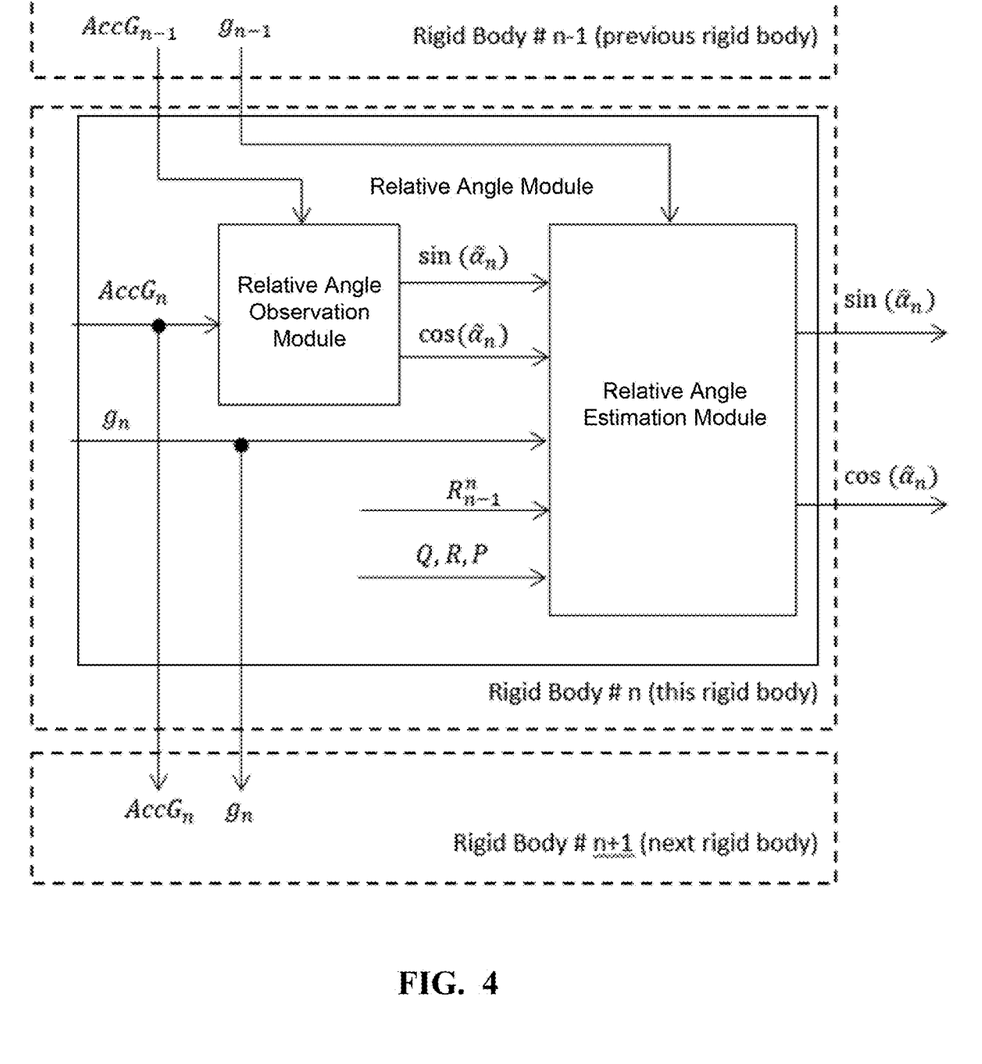
FIG. 4 is a flowchart illustrating a method of determining trigonometric functions of a relative angle between rigid bodies in accordance with some embodiments.

FIG. 4 is a flowchart illustrating a method of determining trigonometric functions $\sin(\hat{\alpha}_n)$ and $\cos(\hat{\alpha}_n)$ of a relative angle $\alpha$ between a rigid body n and a previous rigid body n−1 in accordance with some embodiments. In one example, the trigonometric functions are a sine of the relative angle and a cosine of the relative angle. This flowchart shows how the inputs $AccG_{n-1}$; $AccG_n$; $g_{n-1}$; $g_n$; $R_{n-1}^n$; and Q, R, P can be used to determine the trigonometric functions $\sin(\hat{\alpha}_n)$ and $\cos(\hat{\alpha}_n)$. This flowchart also shows how outputs $AccG_n$ and $g_n$ can be passed to a next rigid body n+1. As with other embodiments, this figure shows that the trigonometric functions can be determined based on IMU observations from the rigid body n and the previous rigid body n−1 without requiring any absolute angles.

Figure 5:
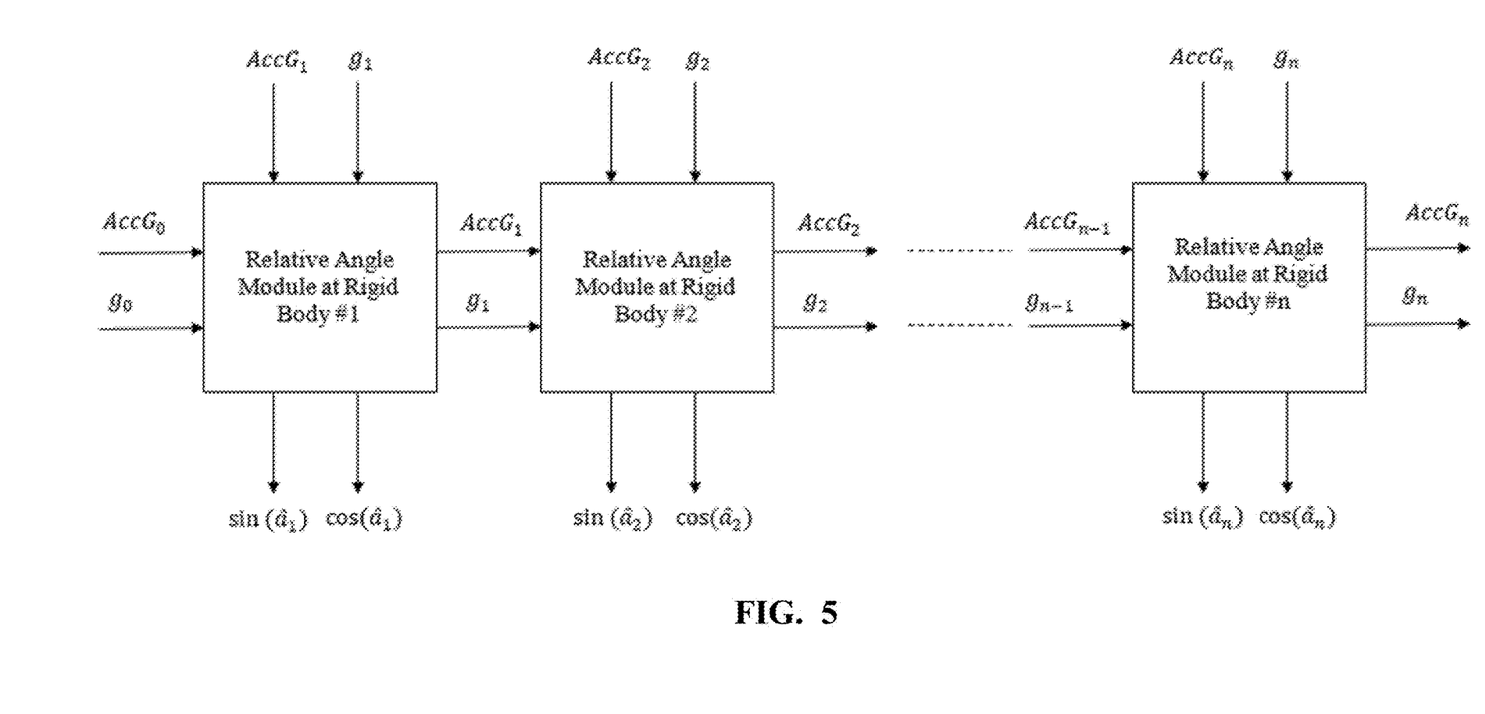
FIG. 5 is a flowchart illustrating methods of determining trigonometric functions of relative angles between a series of rigid bodies in accordance with some embodiments.

FIG. 5 is a flowchart illustrating methods of determining trigonometric functions of relative angles between rigid bodies in accordance with an embodiment. This figure shows three boxes representing the calculation of the trigonometric functions of the relative angles at Rigid Body$_1$, Rigid Body$_2$, and Rigid Body$_n$. Although not specifically shown, each of the rigid bodies have an IMU mounted thereon and are arranged in series similar to the examples shown in FIG. 1.

Each of the boxes in FIG. 5 has a number of inputs that are used to calculate the trigonometric functions. The inputs are represented by arrows pointing inward toward the box. The inputs shown on the left of each box are those that are associated with a previous rigid body in the series. The inputs shown on the top of each box are those that are associated with a current rigid body.

Outputs are represented by arrows pointing away from the box. The outputs shown on the right of each box are values that are passed from the current rigid body to a next rigid body in the series. The outputs shown on the bottom of each box are the trigonometric functions.

For each rigid body (except the first rigid body in the series or the IMU coupled to the first rigid body), the inputs, determined from observations of an IMU associated with a previous rigid body, are:

$g_{n-1}$ is an angular velocity vector of the previous rigid body;

$AccG_{n-1}$ is a gravitational acceleration vector of the previous rigid body.

For each rigid body, the inputs, determined from observations of an IMU associated with the rigid body, are:

$g_n$ is an angular velocity vector of the current rigid body; and $AccG_n$ is a gravitational acceleration vector of the current rigid body;

The outputs that are passed from the current rigid body to the next rigid body are:

$g_n$ is the angular velocity vector of the current rigid body; and $AccG_n$ is the gravitational acceleration vector of the current rigid body.

The previous rigid body is the immediately prior rigid body in the series, and the next rigid body is the immediately following rigid body in the series. In some embodiments, the relative angle between the rigid body (i.e., rigid body n) and the previous rigid body (i.e., rigid body n−1) is represented by the estimated relative angle $\hat{\alpha}_n$ and further represented by estimated trigonometric functions $\sin(\hat{\alpha}_n)$ and $\cos(\hat{\alpha}_n)$ of the angle α. The gravitational acceleration vector and angular velocity at the rigid body n can be used as some of the inputs to determine the estimated trigonometric functions $\sin(\hat{\alpha}_n)$ and $\cos(\hat{\alpha}_n)$. As shown in this example, the trigonometric functions $\sin(\hat{\alpha}_n)$ and $\cos(\hat{\alpha}_n)$ can be determined based on information from the previous rigid body and the rigid body without requiring information from earlier rigid bodies in the series. This example also shows that absolute angles are not required to determine the estimated trigonometric functions $\sin(\hat{\alpha}_n)$ and $\cos(\hat{\alpha}_n)$.

In some embodiments, the trigonometric functions $\sin(\hat{\alpha}_n)$ and $\cos(\hat{\alpha}_n)$ between a rigid body n and a previous rigid body n−1 are calculated based on (i) observed trigonometric functions $\sin(\tilde{\alpha}_n)$ and $\cos(\tilde{\alpha}_n)$; (ii) an angular velocity $(g_n)$ of the rigid body n; (iii) an angular velocity $(g_{n-1})$ of the previous rigid body n−1; a rotation matrix $(R_{n-1}'')$ from the previous rigid body to the current rigid body; a process noice covariance matrix in Kalman Filter parameter, an observation noise covariance matrix in Kalman Filter parameter, and an initial estimation error covariance matrix in Kalman Filter parameter (Q, R, P), respectively. This is shown, for example, in FIG. 3. Once again, the trigonometric functions are determined based on measurements and calculated parameters from the rigid body n and the previous rigid body n−1 without requiring information from earlier rigid bodies in the series or absolute angles of the rigid bodies.

Figure 6:
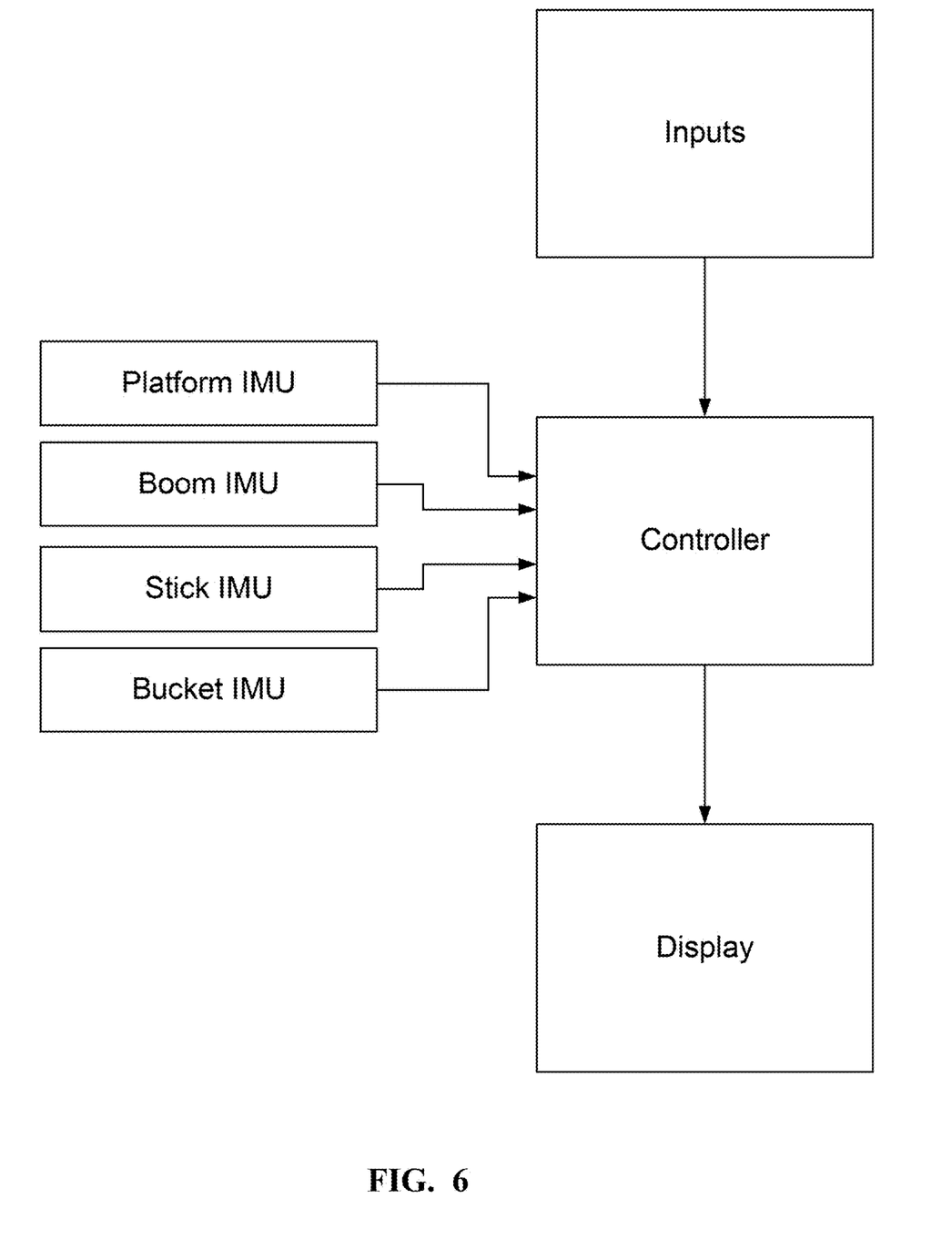
FIG. 6 is a simplified diagram of a control system in accordance with some embodiments.

FIG. 6 is a simplified diagram of a control system in accordance with some embodiments. The system includes a state estimator that may be used, for example, with the excavator shown in FIG. 1 (e.g., controller 50). This figure shows how outputs from IMUs associated with a platform, a boom, a stick, and a bucket are passed to the state estimator. The IMUs provide, for example, measured accelerations and angular velocities to the state estimator. The state estimator uses the measured values, along with other inputs as described in the various embodiments, to determine relative angles and/or trigonometric functions of relative angles. In some embodiments, the state estimator may also determine a position of an implement (e.g., a bucket and/or teeth) as described herein. These values and/or positions may be output on a display to assist an operator.

The state estimator and/or controller typically includes familiar software and hardware components. For example, it may include one or more operating systems, processors, local memories for storage, I/O devices, and system buses interconnecting the hardware components. RAM and disk drives are examples of local memory for storage of data and computer programs. Other types of local memories include magnetic storage media, optical storage media, flash or solid state memories, networked storage devices, and the like.

Figure 7:
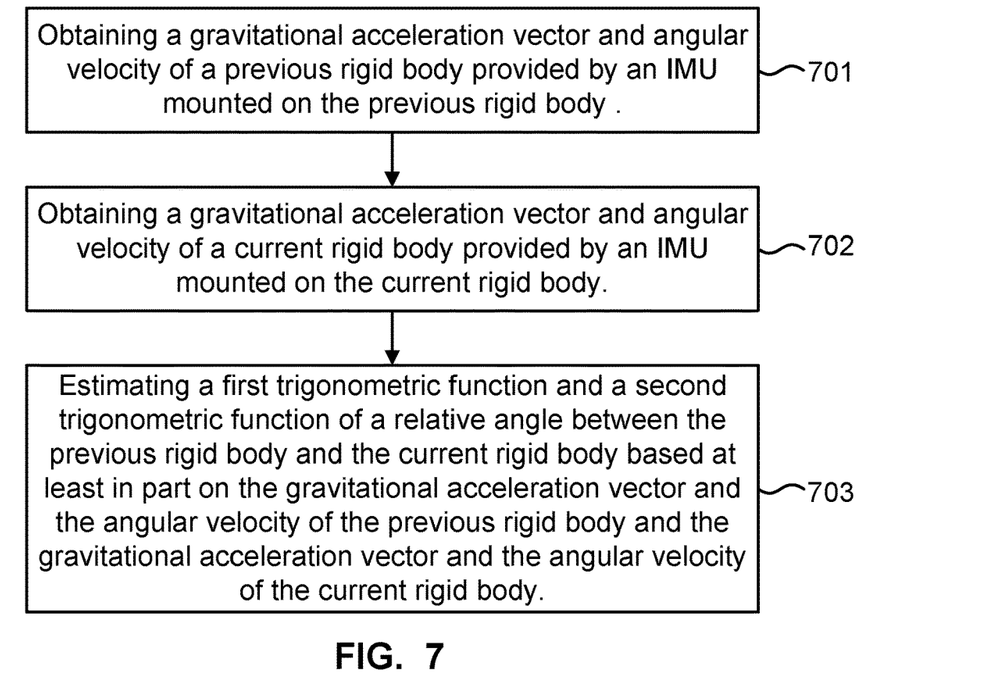
FIG. 7 is a flowchart illustrating a method of determining trigonometric functions of a relative angle between a previous rigid body and a rigid body in accordance with an embodiment.

FIG. 7 is a flowchart illustrating a method of estimating relative angles between rigid bodies in accordance with some embodiments. The rigid bodies may be coupled in a series similar to the rigid bodies of the excavator shown in FIG. 1. The method includes obtaining a gravitational acceleration vector and angular velocity of a previous rigid body from observations of an IMU mounted on the previous rigid body 701. The previous rigid body is the immediately prior rigid body in the series of rigid bodies. The method also includes obtaining a gravitational acceleration vector and angular velocity of a current rigid body from observations of an IMU mounted on the current rigid body 702.

The method also includes estimating a first trigonometric function and a second trigonometric function of a relative angle between the previous rigid body and the current rigid body based at least in part on the gravitational acceleration vector and the angular velocity of the previous rigid body and the gravitational acceleration vector and the angular velocity of the current rigid body 703. As described previously, the trigonometric functions can be determined based on the gravitational acceleration vector of the previous rigid body, the gravitational acceleration vector of the current rigid body, the angular velocity of the previous rigid body, and the angular velocity of the current rigid body. As described previously, estimating the trigonometric functions can also include a rotation matrix from the previous rigid body to the current rigid body, intermediate observed first and second trigonometric functions of the relative angle between the previous rigid body and the current rigid body, a process noise covariance with Kalman Filter parameter, an observation noise covariance with Kalman Filter parameter, and an initial estimation error covariance with Kalman Filter parameter.

Figure 8:
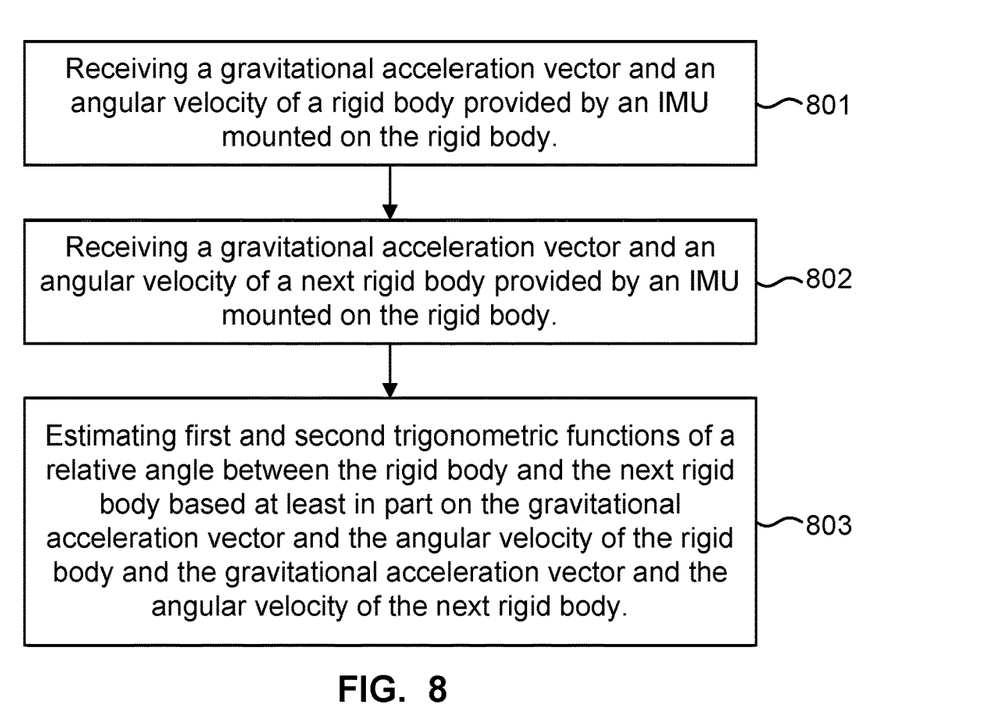
FIG. 8 is a flowchart illustrating a method of determining a relative angle between a rigid body and a next rigid body in accordance with an embodiment.

FIG. 8 is a flowchart illustrating a method of estimating relative angles between rigid bodies in accordance with some embodiments. The rigid bodies may be coupled in a series similar to the rigid bodies of the excavator shown in FIG. 1. The method includes receiving a gravitational acceleration vector and an angular velocity of a rigid body from observations of an IMU mounted on the rigid body 801. The method also includes receiving a gravitational acceleration vector and an angular velocity of a next rigid body from observations of an IMU mounted on the rigid body 802. The next rigid body is the immediately next rigid body in the series of rigid bodies.

The method also includes estimating first and second trigonometric functions of a relative angle between the rigid body and the next rigid body based at least in part on the gravitational acceleration vector and the angular velocity of the rigid body and the gravitational acceleration vector and the angular velocity of the next rigid body 803. As described previously, the trigonometric functions can be determined based on the gravitational acceleration vector of the rigid body, the gravitational acceleration vector of the next rigid body, the angular velocity of the rigid body, and the angular velocity of the next rigid body. As described previously, estimating the trigonometric functions can also include a rotation matrix from the rigid body to the next rigid body, intermediate observed first and second component relative angles between the rigid body and the next rigid body, a process noise covariance with Kalman Filter parameter, an observation noise covariance with Kalman Filter parameter, and an initial estimation error covariance with Kalman Filter parameter.

Figure 9:
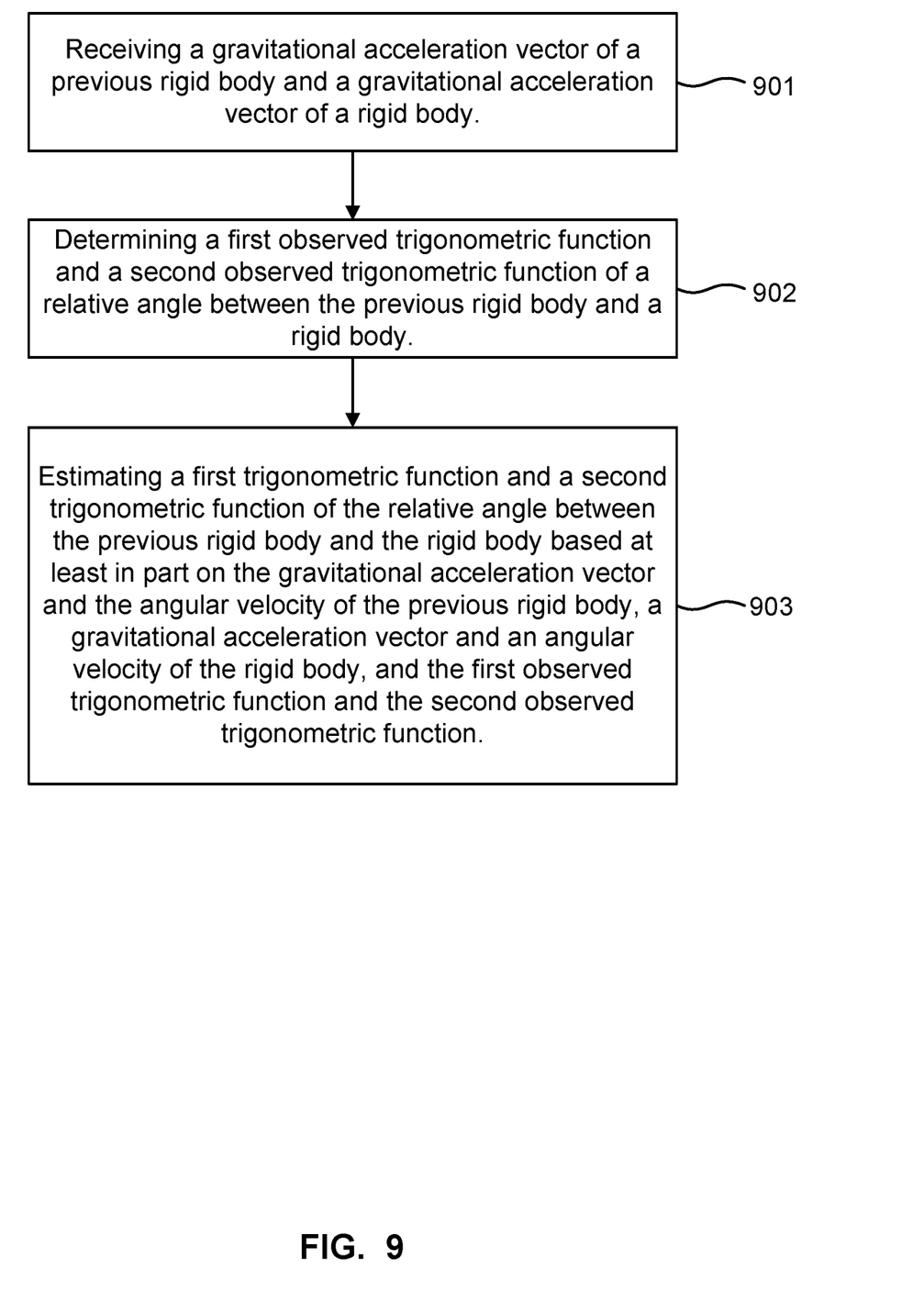
FIG. 9 is a flowchart illustrating a method of determining trigonometric functions of relative angles between rigid bodies arranged in a series in accordance with an embodiment.

FIG. 9 is a flowchart illustrating a method of estimating relative angles between rigid bodies based on observed trigonometric functions $\sin(\tilde{\alpha}_n)$ and $\cos(\tilde{\alpha}_n)$ of a relative angle α between rigid bodies (i.e. a previous rigid body and a rigid body) in accordance with some embodiments. The rigid bodies may be coupled in a series similar to the rigid bodies of the excavator shown in FIG. 1. The method includes receiving a gravitational acceleration vector of a previous rigid body and a gravitational acceleration vector of a rigid body 901. The method also includes determining a first observed trigonometric function of the relative angle and a second observed trigonometric function of the relative angle 902. The method also includes estimating a first trigonometric function of the relative angle and a second trigonometric function of the relative angle between the previous rigid body and the rigid body based at least in part on the gravitational acceleration vector and the angular velocity of the previous rigid body, the gravitational acceleration vector and the angular velocity of the rigid body, and the first observed trigonometric function and the second observed trigonometric function 903. As described previously, the observed trigonometric functions can be determined based on the gravitational acceleration vector of the previous rigid body and the gravitational acceleration vector of the rigid body. Estimating the trigonometric functions based on the observed trigonometric functions may include a rotation matrix from the previous rigid body to the rigid body, a process noise covariance with Kalman Filter parameter, an observation noise covariance with Kalman Filter parameter, and an initial estimation error covariance with Kalman Filter parameter.

Figure 10:
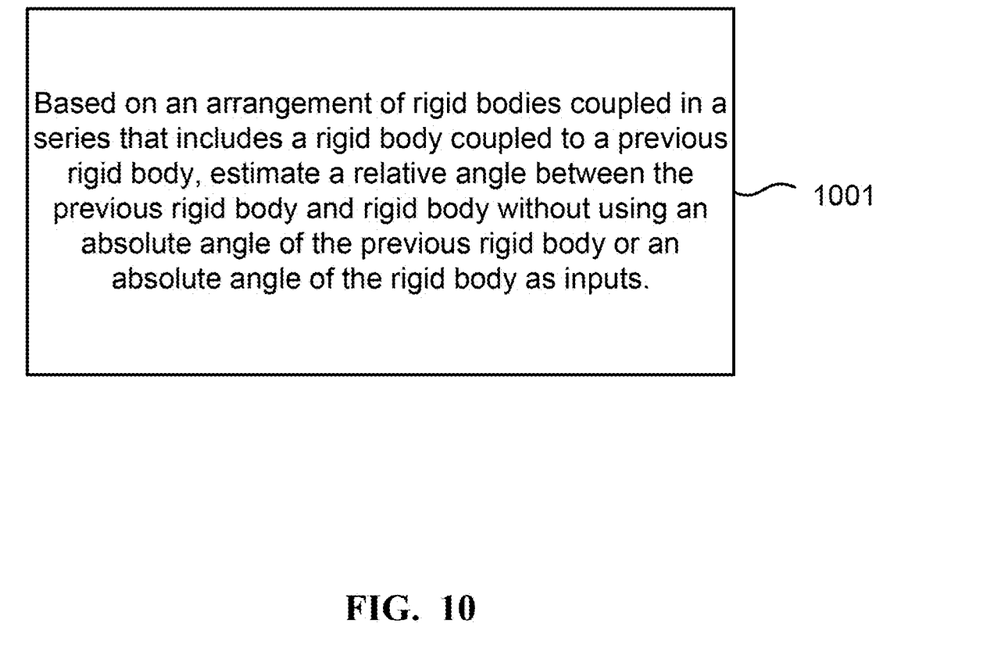
FIG. 10 is a flowchart illustrating a method of determining relative angles between pivotally coupled rigid bodies arranged in a series in accordance to an embodiment.

FIG. 10 is a flowchart illustrating a method of determining angles between pivotally coupled rigid bodies arranged in a series in accordance with some embodiments. The series includes a rigid body arranged between a previous rigid body and a next rigid body similar to some of the rigid bodies of the excavator shown in FIG. 1. The method includes, based on an arrangement of rigid bodies coupled in a series that includes a rigid body coupled to a previous rigid body, estimating a relative angle between the previous rigid body and rigid body without using an absolute angle of the previous rigid body or an absolute angle of the rigid body as inputs 1001.

It should be appreciated that the specific steps illustrated in FIGS. 7-10 provide particular methods according to some embodiments. Other sequences of steps may also be performed according to alternative embodiments. For example, alternative embodiments may perform the steps outlined above in a different order. Moreover, the individual steps illustrated in FIGS. 7-10 may include multiple sub-steps that may be performed in various sequences. Furthermore, additional steps may be added or removed depending on the particular application.

It should be appreciated that some embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description, but with reference to the appended claims along with their full scope of equivalents.

What is claimed is:

1. A method for determining a position of a bucket relative to a platform of an excavator using trigonometric functions of a relative angle between the bucket and a stick of the excavator, the method comprising:

measuring angular velocity and a gravitational acceleration vector of the stick using a first inertial measurement unit (IMU) mounted on the stick;

measuring angular velocity and a gravitational acceleration vector of the bucket using an IMU mounted on the bucket;

estimating a sine of the relative angle between the stick and the bucket and a cosine of the relative angle between the stick and the bucket, the sine and the cosine estimated based at least in part on the gravitational acceleration vector and the angular velocity of the stick, the gravitational acceleration vector and the angular velocity of the bucket, a rotation matrix from the stick to the bucket, and at least one covariance matrix; and determining the position of the bucket relative to the platform of the excavator using at least the sine and the cosine.

2. The method of claim 1 wherein the sine and the cosine of the relative angle between the stick and the bucket are estimated without using an absolute angle of the stick or an absolute angle of the bucket.

3. The method of claim 1 further comprising using the sine and the cosine to determine a relative angle between the stick and the bucket.

4. The method of claim 1 wherein estimating the sine and the cosine of the relative angle between the stick and the bucket includes:

determining an observed sine of the relative angle between the stick and the bucket;

determining an observed cosine of the relative angle between the stick and the bucket;

determining the rotation matrix from the stick to the bucket; and determining the at least one covariance matrix.

5. The method of claim 4 wherein the observed sine of the relative angle and the observed cosine of the relative angle are determined using the gravitational acceleration vector of the stick and the gravitational acceleration vector of the bucket.

6. A method for estimating trigonometric functions of relative angles between coupled rigid bodies each having an inertial measurement unit (IMU) disposed thereon, the method comprising:

measuring angular velocity and a gravitational acceleration vector of a previous rigid body using a first IMU coupled to the previous rigid body;

measuring angular velocity and a gravitational acceleration vector of a rigid body using a second IMU coupled to the rigid body, the rigid body pivotally coupled to the previous rigid body;

determining first and second observed trigonometric functions of a first relative angle between the previous rigid body and the rigid body;

estimating first and second trigonometric functions of the first relative angle between the previous rigid body and the rigid body based at least in part on the gravitational acceleration vector and the angular velocity of the previous rigid body, the gravitational acceleration vector and the angular velocity of the rigid body, and the first and second observed trigonometric functions;

measuring angular velocity and a gravitational acceleration vector of a next rigid body using a third IMU coupled to the next rigid body, the next rigid body pivotally coupled to the rigid body; and estimating first and second trigonometric functions of a second relative angle between the rigid body and the next rigid body based at least in part on the gravitational acceleration vector and the angular velocity of the rigid body and the gravitational acceleration vector and the angular velocity of the next rigid body.

7. The method of claim 6 wherein the first and second trigonometric functions of the first relative angle between the previous rigid body and the rigid body are estimated without using an absolute angle of the previous rigid body or an absolute angle of the rigid body.

8. The method of claim 6 wherein the first trigonometric function of the first relative angle is a sine of the first relative angle between the previous rigid body and the rigid body, and the second trigonometric function of the first relative angle is a cosine of the first relative angle between the previous rigid body and the rigid body.

9. The method of claim 8 further comprising using the sine and the cosine to determine the first relative angle between the previous rigid body and the rigid body.

10. The method of claim 6 wherein the first and second trigonometric functions of the second relative angle between the rigid body and the next rigid body are estimated without using an absolute angle of the rigid body or an absolute angle of the next rigid body.

11. The method of claim 6 wherein the first and second trigonometric functions of the second relative angle between the rigid body and the next rigid body are determined without using the gravitational acceleration vector of the previous rigid body.

12. The method of claim 6 wherein estimating the first and second trigonometric functions of the first relative angle between the previous rigid body and the rigid body includes:
determining a rotation matrix from the previous rigid body to the rigid body; and
determining at least one covariance matrix.

13. The method of claim 12 wherein the first and second observed trigonometric functions of the first relative angle between the previous rigid body and the rigid body are determined using the gravitational acceleration vector of the previous rigid body and the gravitational acceleration vector of the rigid body.

14. A method for determining trigonometric functions of relative angles between a series of separate but coupled rigid bodies, including a previous rigid body and a rigid body, the method comprising:

measuring angular velocity and a gravitational acceleration vector of the previous rigid body using a first IMU coupled to the previous rigid body;

measuring angular velocity and a gravitational acceleration vector of the rigid body using a second IMU coupled to the rigid body;

estimating first and second observed trigonometric functions of a relative angle between the previous rigid body and rigid body;

determining a rotation matrix from the previous rigid body to the rigid body and at least one covariance matrix; and estimating first and second trigonometric functions of the relative angle between the previous rigid body and the rigid body based on the first and second observed trigonometric functions, the angular velocity of the previous rigid body, the angular velocity of the rigid body, the rotation matrix from the previous rigid body to the rigid body, and the at least one covariance matrix.

15. The method of claim 14 wherein the first and second trigonometric functions are calculated without using an absolute angle of the previous rigid body or an absolute angle of the rigid body.

16. The method of claim 14 wherein determining the at least one covariance matrix includes determining at least one of an initial estimation error covariance matrix, a process noise covariance matrix, or an observation noise covariance matrix.

17. The method of claim 14 further comprising determining a relative angle between the rigid body and a next rigid body without using the first and second trigonometric functions between the previous rigid body and the rigid body.

18. A method for determining relative angles between pivotally coupled rigid bodies arranged in series, the method comprising:

measuring angular velocity and a gravitational acceleration vector of a previous rigid body using a first inertial measurement unit (IMU) coupled to the previous rigid body;

measuring angular velocity and a gravitational acceleration vector of a rigid body using a second IMU coupled to the rigid body, the rigid body pivotally coupled to the previous rigid body;

estimating first and second trigonometric functions of a relative angle between the previous rigid body and the rigid body based on the gravitational acceleration vector and the angular velocity of the previous rigid body, the gravitational acceleration vector and the angular velocity of the rigid body, first and second observed trigonometric functions of the relative angle between the previous rigid body and the rigid body, a rotation matrix from the previous rigid body to the rigid body, and at least one covariance matrix; and estimating the relative angle between the previous rigid body and the rigid body using the first and second trigonometric functions, wherein the relative angle between the previous rigid body and the rigid body is determined without using an absolute angle of the previous rigid body or an absolute angle of the rigid body.

19. The method of claim 18 wherein the at least one covariance matrix includes at least one of an initial estimation error covariance matrix, a process noise covariance matrix, or an observation noise covariance matrix.

* * * * *